United States Patent

Brown et al.

[11] Patent Number: 6,051,169
[45] Date of Patent: Apr. 18, 2000

[54] VACUUM BAKING PROCESS

[75] Inventors: Charles Allan Brown, Los Gatos; John Martin Burns, San Jose; Holavanahally Seshachar Nagaraj, Morgan Hill; James Joseph O'Neill, Morgan Hill; Muhammad Inayet Ullah, Morgan Hill; Leo Volpe, Menlo Park; Herman Russell Wendt, San Jose, all of Calif.

[73] Assignee: International Business Machines Corporation, Armonk, N.Y.

[21] Appl. No.: 08/920,161

[22] Filed: Aug. 27, 1997

[51] Int. Cl.[7] ..................................... B29C 71/02
[52] U.S. Cl. .......................... 264/40.1; 264/102
[58] Field of Search .................. 264/40.1, 40.3, 264/102; 156/382

[56] References Cited

U.S. PATENT DOCUMENTS 3,485,908  12/1969  Burger .
3,694,601   9/1972  Atkinson .
3,708,876   1/1973  Klehm, Jr. .
3,755,890   9/1973  Klehm, Jr. .
3,953,663   4/1976  Kelhm, Jr. .
4,333,900   6/1982  Carey .
4,356,116  10/1982  Beers ........................................ 524/837
4,619,798  10/1986  Tanaka et al. .
5,085,745   2/1992  Farber et al. .
5,436,776   7/1995  Kurokawa ................................ 360/103
5,601,125   2/1997  Parsoneault et al. .
5,610,105   3/1997  Vines et al. .
5,640,764   6/1997  Strojnik .

*Primary Examiner*—Jan H. Silbaugh
*Assistant Examiner*—Kenneth M. Jones
*Attorney, Agent, or Firm*—R. B. Martin

[57] ABSTRACT

A method of degassing a disk drive component including heating the drive component to a temperature ranging from about 70° C. to 250° C.; subjecting the drive component to vacuum pressure during heating, the vacuum pressure having a first pressure and a second pressure; and monitoring the vacuum pressure to determine the level of degassing of the disk drive component.

24 Claims, 8 Drawing Sheets

VACUUM BAKING PROCESS

FIELD OF THE INVENTION

The invention relates generally to vacuum baking processes to remove fugitive organic constituents from plastic and elastomeric components which may be released to contaminate the environment of operation. More particularly, the invention relates to vacuum baking disk drive components to remove fugitive organic additives and contaminants from these components.

BACKGROUND OF THE INVENTION

The continuing effort to increase data storage capacity in magnetic disk drives is concerned largely with increasing the density of data that can be stored on the available recording surface area. Such assemblies typically include an elongated shaft or spindle, a hub fixed to the shaft and supporting the disks, and bearings and bushings at opposed ends of the shaft, to support the shaft, hub and disks for rotation relative to the disk drive housing. Also mounted movably with respect to the housing is an actuator, either of the rotary or linear type, for selectively positioning data transducing heads relative to the disks.

The design and manufacture of such drives involves disparate and often competing needs. The preferred high data storage densities require precision alignment of the disk pack and actuator, stability during rotation of the spindle assembly and resistance to thermal effects due to differing thermal expansion coefficients of materials employed in the drive. The housing must be strong, lightweight, resistant to vibration and provide an effective seal to prevent contamination of the housing interior, particularly in the region of the disks. At the same time, cost considerations stimulate efforts to reduce the number of parts and steps involved in assembling disk drives.

It is essential that the magnetic disc upon which information is to be stored is kept clean to avoid interference with the read/write heads which must operate in very close proximity to the surface of the disc. Toward this end, air is ordinarily circulated inside the compartment containing the rotating magnetic disc. Air may be passed through a filter to remove small particles from the gas within the compartment. Filtration of the gas surrounding the disc helps to maintain the clean atmosphere required for reliable operation of a magnetic disc.

However, materials will occasionally outgas from the components of the disk drive. If the outgassed materials are permitted to migrate and deposit onto a surface of the magnetic disc, interference with the reliable operation of the information storage and retrieval system is likely to result.

In order to inhibit the outgassing and aerosoling of grease from the central rotary bearings, shielded bearings (e.g. bearings having non-contacting rubber or metal shields) are ordinarily employed, but even these components are capable of outgassing a sufficient quantity of contaminants to interfere with operation of the information storage and retrieval system. One method of reducing aerosol contaminants is the use of structural means such as traps, seals, and filters.

Another alternative to using seals and filters is to degas component parts of the assembly. For example, Tanaka, et al., U.S. Pat. No. 4,619,798 Dec. 24, 1984 discloses a method of fabricating high purity SiC parts using a heating furnace includes a vacuum baking step at high temperature (800° C. to 1300° C.) for degassing the fabricated tube.

Kehlin, U.S. Pat. No. 3,953,663 also discloses a process step in the fabrication of dual sided printed circuit boards. Prior to soldering, the contaminants within the via holes are driven out by a vacuum bake step.

Further, each of U.S. Pat. Nos. 3,708,876 and 3,755,890 disclose a process step in the fabrication of dual sided printed circuit boards. Prior to soldering, the contaminants within the via holes are also driven out by a vacuum bake step.

However, even with the use of vacuum baking processes, problems exist. Baking processes can have deleterious affects on component parts. Also baking by simply heating may be only marginally effective depending upon the conditions of processing. Further, prior art processes have tended to generally focus on removal of constituents having a higher vapor pressure such as lubricants, greases, and fluids.

As a result, a need exists for a process which reduces gaseous contaminants present as part of disk drive components which may contaminate the disk drive environment.

SUMMARY OF THE INVENTION

In accordance with one aspect of the invention, there is provided a method of degassing a disk drive component comprising the steps of heating the drive component to a temperature ranging from about 70° C. to 250° C.; subjecting the drive component to vacuum pressure during heating, wherein the vacuum pressure comprises a first pressure and a second pressure; and monitoring said vacuum pressure to determine the level of degassing of the disk drive component.

In accordance with a further aspect of the invention, there is provided a method of determining the level of outgassing of a component by monitoring pressure in a closed chamber, the method comprising the steps of heating the component, subjecting the drive component to vacuum pressure during heating, the vacuum pressure comprising a first pressure and a second pressure, wherein the second pressure indicates the level of degassing of the component.

Chemical contamination in disk drives has become a major focus in the design as the head-to-disk spacing is reduced for high density performance files. Volatile contamination emanating from the spindle motor and other drive components is considered a major factor in contamination. In particular, a solution is offered for greatly reducing the chemical contaminants outgassing from drive components such as the motor bearing shields, voice coil motor damper, electrostatic media, gasket covers, crash stops, and the like.

For example, shields for spindle motor bearings for drives are commonly made of nitrile type elastomers with steel backing. In the formulation and fabrication of these shields various hydrocarbon type and silicone type lubricants are used. NMR analysis of these shields has identified phthalates (dioctyl and dibutyl), aliphatic hydrocarbons, methyl silicone and amines as outgassable materials.

One exemplary embodiment of the invention includes vacuum baking of these nitrile shields at an elevated temperature. This process has been shown to eliminate, or greatly reduce the presence of volatile organic compounds thought to contaminate the drive.

The invention provides for the vacuum baking of drive components which comprise plastics and elastomers. Unlike prior processes which degassed liquids and greases, the process of the invention may be used to withdraw organic compounds from the solid components by heating the component part to a temperature which is about 50% to 80% of the component parts degradation, decomposition or service temperature. The heating is conducted for a period of time sufficient to remove about 90 wt-% of all volatile organics from the component.

The vacuum pressure may be used to monitor the level of degassing, with an ambient pressure in the oven of less than about 50 millitorr, preferably about 10 to 50 millitorr indicating degassing of the components parts at a level of greater than about 90 wt-%, preferably about 95 wt-, and more preferably about 99 wt-% volatile organics.

In the context of this invention, the service temperature of a component part comprising a thermoplastic is the temperature at which the thermoplastic, is no longer capable of holding its molded form and dimensions, free of support. For components comprising thermosetting resins, the service temperature is that temperature at which the thermosetting resin begins to crosslink, sinter and degrade, thereby losing its dimension. Components processed in accordance with the invention are generally formed solids at room temperature, generally about 22° C. to 35° C., preferably about 24° C. to 28° C.

DETAILED DESCRIPTION OF THE PREFERRED EMBODIMENTS

Figure 1:
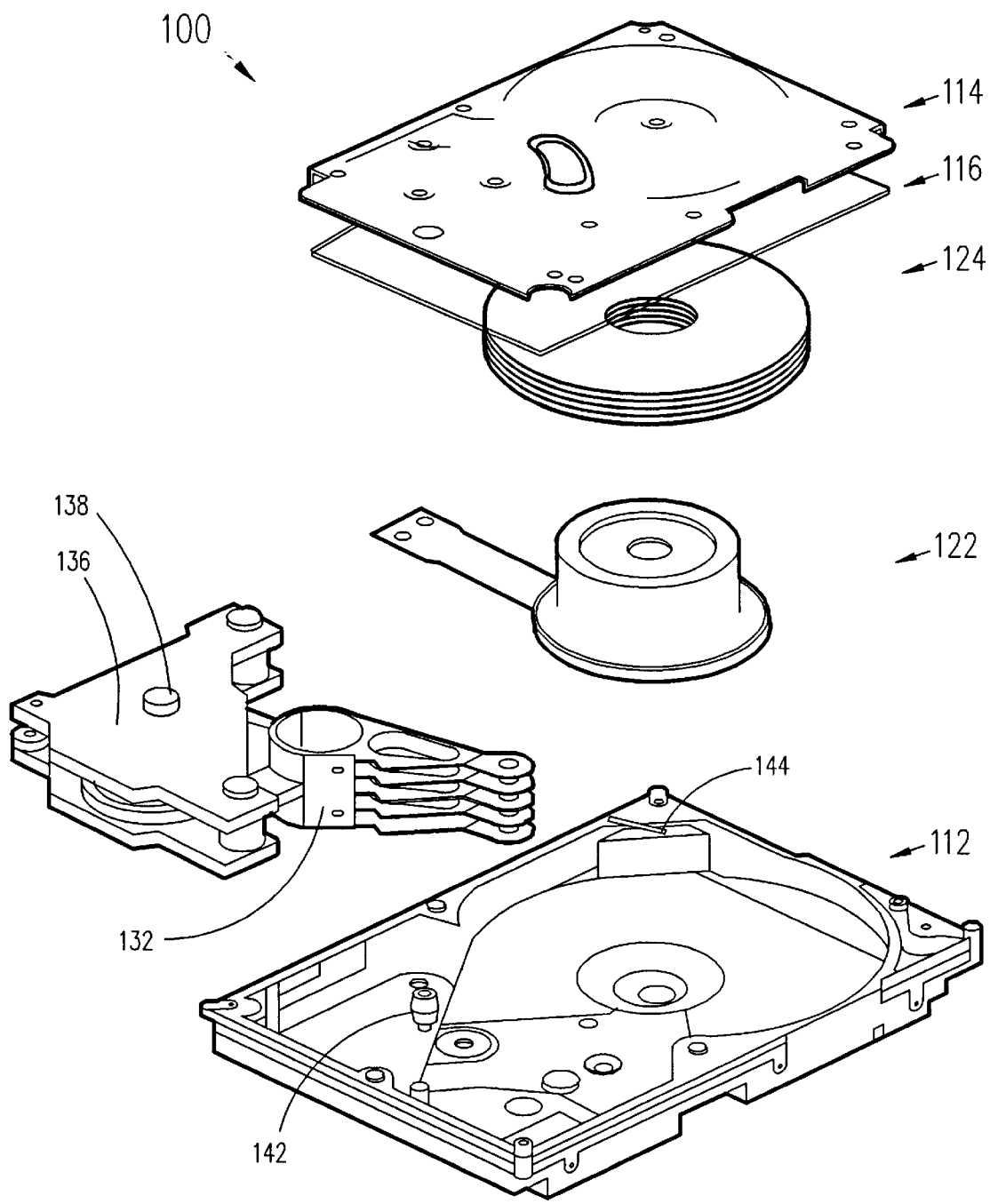
FIG. 1 is an exploded view of a disk drive assembly which contains component parts that may be processed in accordance with the method of the invention.

The invention is a method of degassing a disk drive component. The method comprises the steps of heating the drive component to a temperature ranging from about 70° C. to 250° C.; subjecting the drive component to vacuum pressure during heating, wherein the vacuum pressure comprises a first pressure and a second pressure; and monitoring the vacuum pressure to determine the level of degassing of the disk drive component.

A. Processable Materials

Any disk drive component which is thought to contribute contaminants to the disk drive environment may be processed in accordance with the invention. Generally, the invention is most useful when processing or treating components which contain plastics, elastomers, and/or adhesives. Generally these constituents are characterized as either being thermoplastic or thermosetting, including composites resulting from these materials. Thermoplastics and thermosets may generally contain resins which provide structure or bulk density, tackifiers which contribute adhesion, and plasticizers which provide flow properties.

Thermoplastic compositions that may be processed in accordance with the invention include vinyl polymers, polyesters, polyamides, polyimides, polyamide-imides, polyethers, block polyamides-polyethers, block polyesterspolyethers, polycarbonates, polysulfones, poly bisimidazoles, polybisoxazoles, poly bisthiazoles, and polyphenyl polymers. Other useful thermoplastics include nylons, polyacetals, polyester elastomers, polyurethanes, polyphenyl-aniline sulfides, polypropylenes, polyether ether ketones, as well as elastomeric thermoplastics including butyl rubber, ethylene vinyl acetate copolymers, as well as SOS, SBS and SIS block copolymers and the like. Also processable with the invention are polycarbonates, and polyolefins such as polypropylene.

Vinyl polymers which are processable with the invention, include polyethylene, polypropylene; rubbery polymers and copolymers prepared from monomers including ethylene, propylene, styrene, acrylonitrile, butadiene, isoprene, and others, acrylic acid, methacrylic acid, methylacrylate, methylmethacrylate, vinyl acetate, hydroxy methacrylate, hydroxy ethylacrylate, as well as other known vinyl monomers.

The method of the invention may also be used to process any variety of curable thermoset compositions which are capable of being crosslinked or cured through heat. Thermosetting compositions which may be processed in accordance with the invention include epoxies, polyurethanes, curable polyesters, hybrid thermosets, and curable acrylics among a large number of compositions. Also processable by the invention are bismaleimides such as the partial reaction product of the bismaleimide of methyl dianiline.

Other curable thermoset composition which also may be processed with the invention include silicones, phenolics, polyamides, and polysulfides, among others. The invention may also be used to process curable and unsaturated polyester resins such as, for example, maleate resins formed by the reaction of various polyols and maleic anhydride; orthophthalic resins formed by reaction of phthalic anhydride and maleic anhydride or fumaric acid and as dibasic acids; and isophthalic resins formed by preparing isophthalic acid and maleic anhydride or fumaric acid.

The invention may also be used to process bis-phenol fumarides which may be prepared by the reaction of propyloxylated or ethoxylated bisphenol A with fumaric acids; and chlorendic polyester resins prepared by reacting chlorendic anhydride with maleic anhydride or fumaric acid.

Other exemplary thermosetting compositions which may be processed in accordance with the invention include the reaction product of orthotolyl biguanide known as casmine and commercially available from SBS Chemicals Inc. and the diglycidyl ether made from bis-phenol A-epichlorohydrin; triglycidyl isocyanurate thermosetting compositions; bis-phenol A-epichlorohydrin diglycidyl ether cured with phenolic crosslinking agents; aliphatic urethane thermosetting compositions such as unblocked isofuron diisocyanate-E-caprolactam available from Ruco Polymer Corporation under the commercial name $NI_2$ which may be used with Ruco HBF which is a hydroxyl terminated polyester resin also available from Ruco Polymer Corporation; BTDA thermosetting compositions which are generally the reaction product of 3,3,4,4-benzophenone tetracarboxylic dianhydride and a bis-phenol. A-epichlorohydrin diglycidyl ether; hybrid thermosetting compositions which are the reaction product of a carboxylated saturated polyester curing agents and bis-phenol A-epichlorohydrin diglycidyl ether; standard bis-phenol A-epichlorohydrin diglycidyl ether thermosets such as those which are cured from 2-methylimidazole; and standard bis-phenol A-eprchlorohydrin diglycidyl ether thermosets which are cured with 2-methylimidazole and dicyandiamide thermosetting compositions.

The fugitive compounds which may result from the vacuum baking process of the invention include, for example, adipic acid derivatives including heptyl, nonyl adipate, bis(2-ethylhexyl) adipate (DOA), and bis(2-butoxyethyl) adipate; azelaic acid derivatives including bis (2-ethylhexyl) azelate (DOZ); benzoic acid derivatives including dipropylene glycol dibenzoate; citric acid derivatives including tri-n-butyl citrate, and tri-n-butyl acetylcitrate; epoxy derivatives including epoxidized soy oil (ESO), and 2-ethylhexyl epoxy tallate; glycol derivatives including triethylene glycol di(2-ethylbutyrate); hydrocarbons derivatives including hydrogenated terphenyls HB-40, and chlorinated paraffin (52 wt % chlorine) Cereclor S-52; oleic acid derivatives including butyl oleate; phosphoric acid derivatives including tributyl phosphate, tri(2-ethylhexyl) phosphate (TOF), tributoxyethyl phosphate, triphenyl phosphate (TPP), tricresyl phosphate (TCP), t-butylphenyl diphenyl phosphate, and 2-ethylhexyl diphenyl phosphate; phthalic acid derivatives including dimethyl phthalate (DMP), dibutyl phthalate (DBP), di(heptyl, nonyl, undecyl) phthalate, bis(2-ethylhexyl)phthalate (DOP), di(n-hexyl), n-octyl, n-decyl), phthalate DNODP-610, diisononyl phthalate (DINP), diisodecyl phthalate (DIDP), diundecyl phthalate (DUP), ditridecyl phthalate (DTDP), butyl benzyl phthalate (BBP), 7-(2,6,6,8-tetramethyl-4-oxa-3-oxo-nonyl) benzyl phthalate Santicizer 278, and dicyclohexyl phthalate (DCHP); polyesters including adipic acid polyester (mol wt 6000) Paraplex G40, adipic acid polyester (mol wt 2000) Drapex 334F, and azelaic acid polyester (mol wt 850) Plastolein 9720; ricinoleic acid derivatives including methyl ricinoleate, and castor oil (90 wt % glyceryl ricinoleate); sebacic acid derivatives including di-n-butyl sebacate (DBS), bis(2-ethylhexyl)sebacate (DOS); stearic acid derivatives including n-butyl stearate; sulfonic acid derivatives including N-ethyl (o,p)-toluenesulfonamide, and alkyl sulfonic acid ester of phenol and cresol, Mesamoll; terseness and derivatives including camphor, and hydrogenated methyl ester of rosin, Hercolyn D; and trimellitic acid derivatives including tris(2-ethylhexyl)trimellitate (TOTM).

This list should not be construed as limiting, but merely exemplary of the type of compounds which may come from formed plastic and elastomeric components of drives.

B. The Disk Drive Assembly

Figure 2:
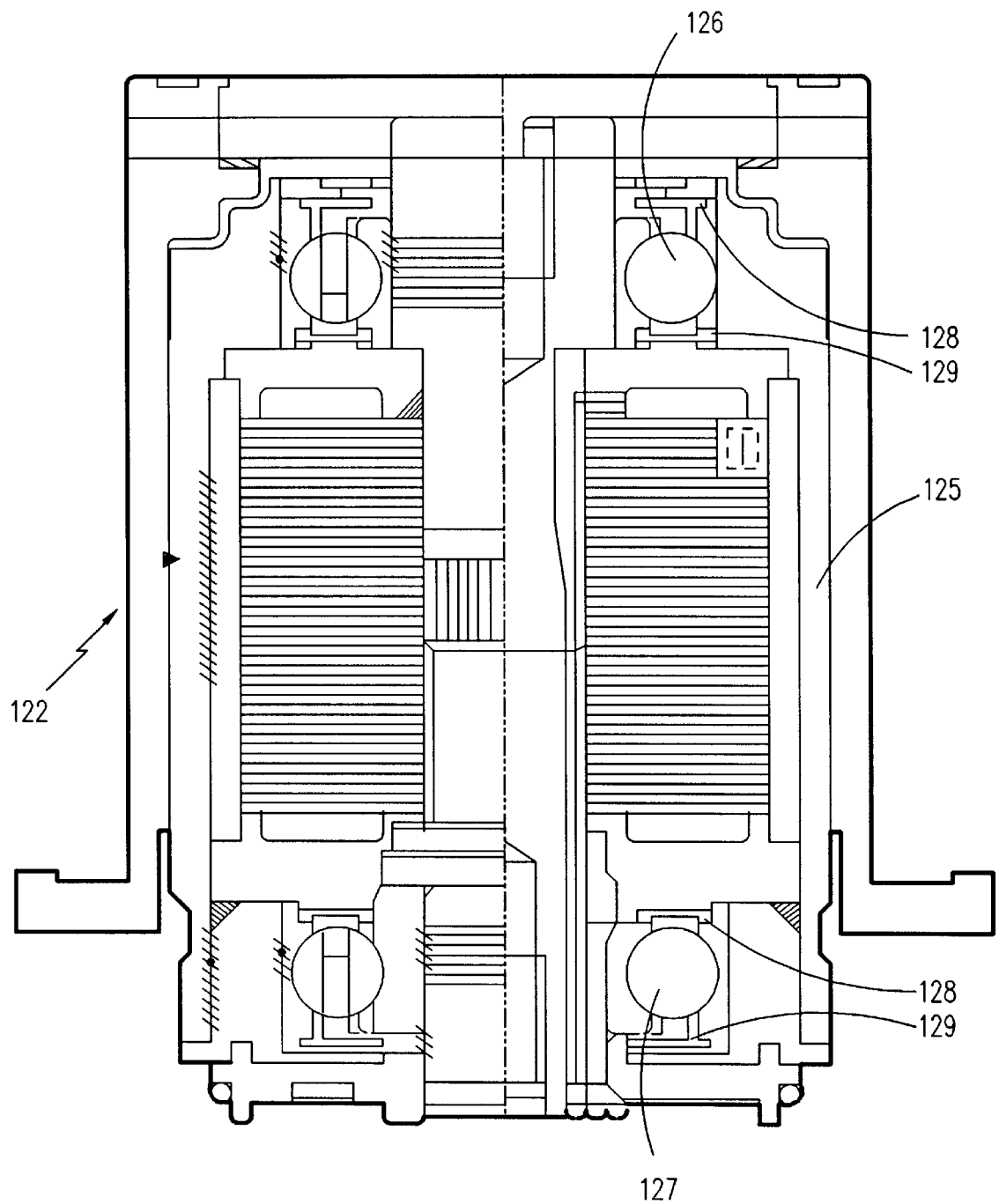
FIG. 2 is a cutaway view of spindle shaft and motor shown in FIG. 1.

An exemplary drive assembly may be seen in FIG. 1 which is an exploded view of a disk drive 100. The disk drive 100 includes a housing 112 and a housing cover 114. A seal 116 is mounted between the housing 112 and the cover 114. Mounted within the housing is a motor and spindle shaft 122. Rotatably attached to the spindle shaft 122 are a number of disks 124. In FIG. 1, five disks 124 are attached to the spindle shaft 122 in spaced apart relation. The disks 124 rotate on spindle shaft 122 which is powered by a motor (contained within the spindle shaft, See FIG. 2). Revolution of the spindle shaft 122 occurs by the action of the motor 125. The motor 125 contains various bearings 126 and 127 which are closed to the disk drive environment by shields. Shields are placed above 128 and below 129 each of the bearings and are positioned in close proximity to the bearings, FIG. 2.

Information is written on or read from the disks 124 by heads or magnetic transducers which are supported by sliders coupled to suspensions or load springs (not shown). The load springs are attached to separate arms 130 on an E block or comb 132. The voice-coil magnet (VCM) 136 powers pivoting of the comb on a shaft (not shown). To dampen vibrations due to pivoting, a damper 138 between the VCM and the cover is commonly used. One or more crash stops 142 limit the motion of assembly and thereby contain the heads on the disks. A recirculation filter 144 may also be used to purify air circulating inside the drive assembly.

In a typical magnetic recording system, data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

C. Processing

Generally, the process of the invention includes heating a disk drive component at a gradually reduced pressure over a given time period. The components which may be treated include, for example, bearing shields, filter media, rubber seals, crash stops, and voice coil magnet dampers among other components.

The process may be undertaken using any number of vacuum and heating apparatus. Commercially available vacuum ovens may be used. These ovens should provide a vacuum which proceeds below 10 millitorr when the oven is empty. Various disk drive components are degassed over temperatures ranging from about 70° C. to 250° C. with pressures proceeding to well below 20 millitorr.

The process of the invention should also provide for temperature uniformity. That is, the temperature gradients inside the oven should not exceed ±3° C. To do so, a fixture preferably comprising aluminum is used which facilitates heat transfer and, in turn, degassing.

In accordance with the invention, there is also provided a convenient means of trapping the outgassed materials such as an activated carbon surface inside the oven or other means.

In accordance with the invention, disk drive components are generally processed by placing the components in the oven, evacuating the oven during the process of increasing the heat, and baking one or more component parts at a certain temperature and pressure over a given time. Once this time is complete or the requisite pressure is found, the vacuum may be released and the components are removed and then cooled under ambient conditions.

Generally when the pump is started the pressure is quickly lowered from ambient to an atmosphere at about 1000 millitorr. A reading of about 50 millitorr preferably about 20 millitorr is indicative of nearly complete outgassing of the component part. If the pressure remains higher than 50 millitorr it usually indicates that the component part has not been completely outgassed.

The temperature of the oven may range from about 30° C. to 250° C., preferably about 70° C. to 150° C. Over the process, the temperature may either be varied or held constant. If the temperature is too low, the rate of degassing may be hindered and take extended periods of time. If the temperature is too great, higher rates of outgassing may occur but the degradation temperature of the part may result in deformation of the component part.

We have found that temperatures ranging from 50% to 80% of the degradation, decomposition, or maximum service temperatures of the material of construction may of the component part be used to successfully outgas a specific part. Generally, vapor pressure will increase by a factor of two with every increase in temperature of about 10° C. Vapor pressure correlates to the ability of the component part to be outgassed.

Generally, the time taken to outgas a component part, after the degas temperature is reached, ranges from about 1 hour to 24 hours preferably from about 5 hours to 12 hours, and more preferably from about 10 hours to 12 hours. The time of processing will generally be determined by the level of efficiency desired in the process, as well as the need to coordinate processing with other aspects of component manufacture.

In accordance with the further aspect of the invention, the vacuum bake process is usually conducted using a fixture in the vacuum oven. The fixture functions to hold the component part and diminish heat gradients which may otherwise occur in the oven. To this end, the fixture preferably does not contribute to outgassing contaminants. Fixtures are preferably cleaned and do not contain any internally outgassable constituents. Additionally, the fixture should provide good heat conduction to allow for temperature uniformity in the oven.

Preferred fixtures include those made from aluminum and aluminum alloy. The fixture may also comprise any number of supports to hold disk drive components including trays, rods, studs, etc. In order to allow for rapid conduction of heat from the oven to the actual component parts, the fixture preferably has a size which approaches the volume of the oven.

One vacuum oven which has been useful includes that manufactured Sheldon Mfg. of Cornelius, Oreg. as vacuum oven brand 1450D. This vacuum oven is easily modified to include various vacuum pumps, traps, and sensors in accordance with the invention.

Vacuum pumps which have been found useful in accordance with the invention include those manufactured by Leybold of Germany under the model number D16B.

Additionally, an activated carbon filter may be used to absorb the outgas contaminants. We have found that the activated carbon filter is most useful when placed at the front of the oven or on the oven floor and when a particle filter is put on the outside of the carbon filter. Carbon useful in accordance with the invention include those made of coconut shell, such as the manufactured by Calgon Carbon from Pittsburgh, Pa. and Barnaby Sutcliff of Columbus, Ohio.

Other modifications of the vacuum oven include the use of a pressure sensor connecting with the inside the oven to determine the ambient pressure within the oven. Also useful is a temperature sensor which is placed in the free volume of the oven to read the actual temperature in that volume.

More particularly, in accordance with the invention the vacuum oven system maybe composed of a vacuum chamber comprising walls with sufficient strength to withstand the external atmospheric pressure when the chamber is evacuated, and a door to allow parts to be loaded and unloaded when the chamber is at ambient pressure, and a gasket or seal made of elastomeric materials to maintain the seal between the door and the chamber. The elastomeric materials must be capable of withstanding the bake temperatures and free of outgassing constituents.

The system of the invention also comprises sealed passages or connections to allow removal of air to apply vacuum, to admit air or inert gas at the end of the process so that the internal and external pressures are equalized and the door opened to allow parts to be removed, and to measure the temperature and pressure within the chamber. Connections to remove air should have at least 1-inch diameter for each 5 cu. ft. of chamber volume.

The vacuum oven also comprises means to heat the vacuum chamber, commonly consisting of electrical heating elements attached to the outer wall of the vacuum chamber.

The oven also contains an outer shell to support the vacuum chamber and door, to enclose electrical wiring, and optionally to house any measuring instruments and readout displays. Between the exterior of the vacuum chamber and the outer shell is placed a layer of insulation to reduce the loss of heat and minimize the power required to operate the oven.

Means for controlling the temperature of the vacuum chamber within a specified range is generally also provided along with means for supporting parts in the vacuum chamber in a manner than allows sufficient space for diffusion of any volatile outgassing materials to diffuse away from the parts.

The oven system also generally comprises an insert within the vacuum chamber made of thermally conductive materials to allow even distribution of the temperature within the oven.

A vacuum system is provided which includes a pump, valves, traps and tubing such as are commonly used to apply high vacuum in industrial or laboratory processes. Typically the pump will have an ultimate vacuum rating of 0.1 millitorr (1E-4 Torr) and a free air capacity equal to or greater than a volume equivalent to the internal empty volume of the vacuum chamber in one minute, e.g. for an oven of internal volume of 4 cubic feet, the pump would have a free air capacity equal to or greater than 4 cfm. It is preferable that the pump free air pumping capacity be a volume equivalent to at least twice that of the empty volume of the vacuum chamber.

As part of the containment absorption system, there is generally provided a means for trapping or absorbing the constituents which have been outgassed from the disk drive components. This is typically a bed of absorbent, preferably activated carbon, which is placed in intimate communication with the interior of the vacuum chamber. As an alternative, a cold plate may be provided in intimate communication with the interior of the vacuum chamber. The door to the oven, cooled by flowing air or other means may serve as the cold plate.

As the door to the oven is commonly a heat leak which may reduce the temperature uniformity in the vacuum chamber, means are provided to reduce this heat risk. If a vertical absorber bed is used and placed at the front of the oven, it serves to provide means to reduce such heat loss. If another location is used for the absorber, or if a cooled door is used as a trap for the material, a polished reflective metal plate is placed between the parts and the door to serve as a heat reflector. In high vacuums such as are used in this oven transfer occurs via radiative processes and that an infrared energy reflective surface such as polished metal serves as an efficient block to such radiative processes.

The vacuum chamber and related gauges, controller, etc. is commonly placed on a support to allow the vacuum chamber to be at a convenient height for loading and unloading. This support may be rigidly connected to, or be an integral part of, the external housing of the vacuum chamber.

The table below provides guidelines for use of the method of the invention:

TABLE

|  | Useful | Preferred | More Preferred |
| --- | --- | --- | --- |
| Temperature (° C.) | 50–250 | 70–200 | 80–150 |
| Vacuum (mtorr) | 50 or less | 20–10 | less than 10 |
| Time | 5–48 | 5–24 | 10–12 |

The method of the invention results in drive components which have from about 0.5 wt-% to 0.1 wt-%, and preferably from about 0.1 wt-% to below a detectable value or 0 wt-% volatile organics remaining after processing.

WORKING EXAMPLES

The following examples provide a nonlimiting illustration of the invention.

Generally, a vacuum oven may be used to process components in accordance with the invention.

Figure 3:
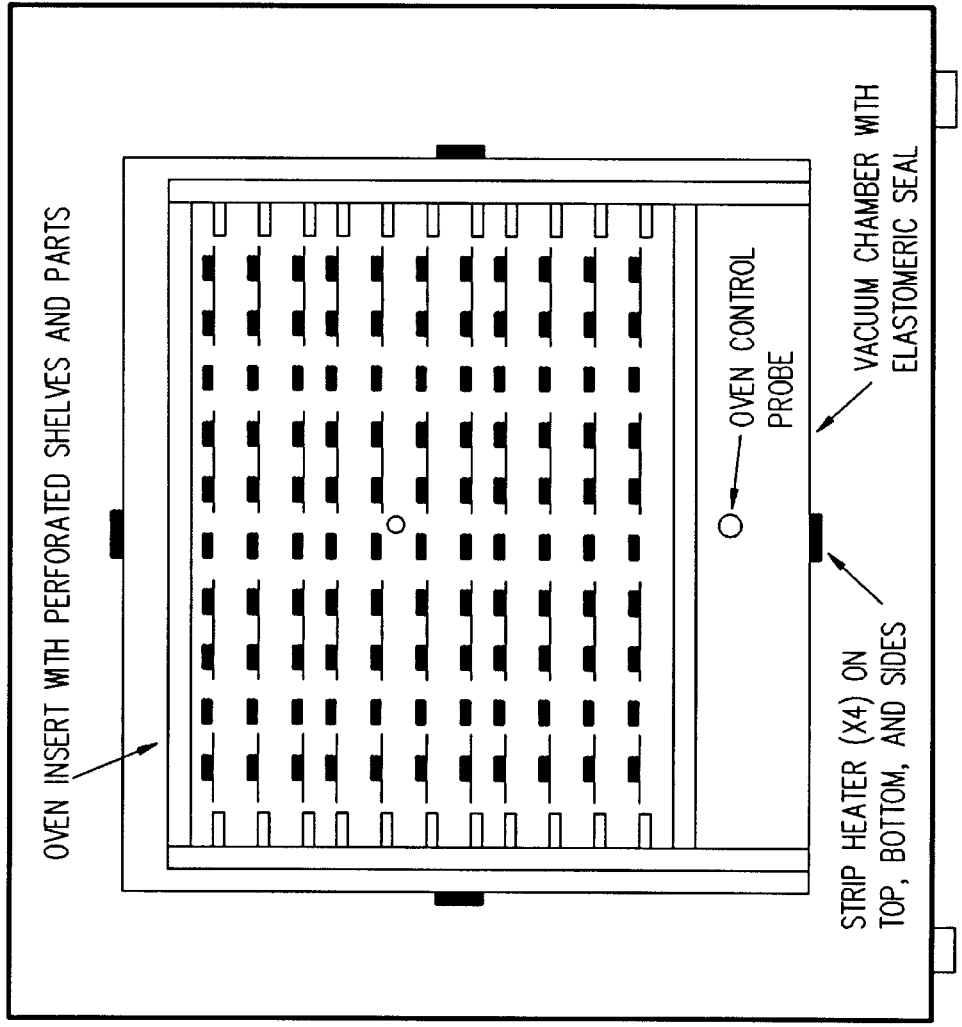
FIGS. 3 and 4 are respective front and side cutaway views depicting our embodiment of the vacuum oven and fixture used in accordance with one aspect of the invention.

The apparatus may be configured as exemplified in FIGS. 3–8. FIG. 3 depicts a front view of an oven chamber with the activated carbon absorber removed. As can be seen, various parts are shown on shelving.

Figure 4:
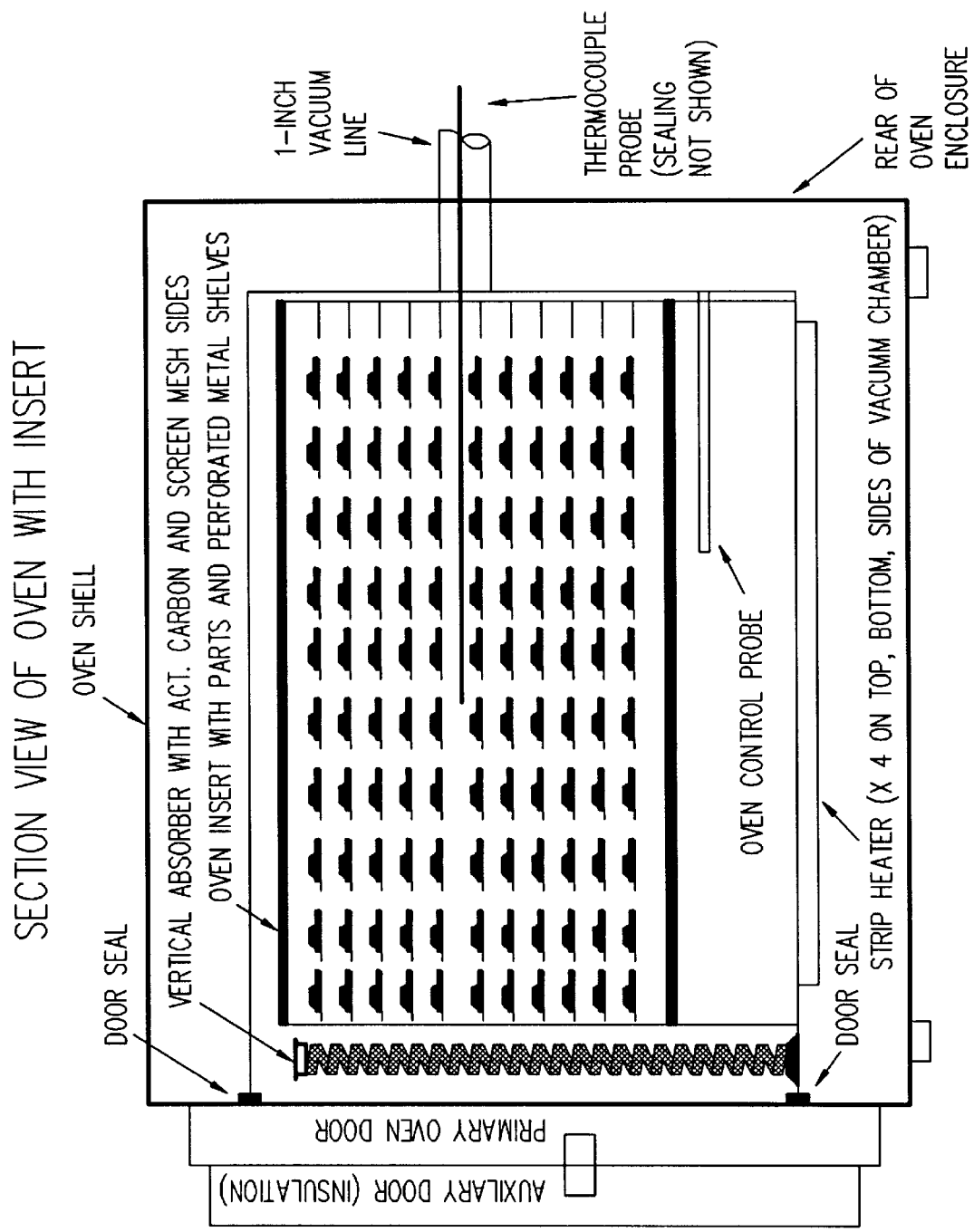

FIG. 4 is a side plan view which has been cutaway showing the same oven depicted in FIG. 3. However, in this Figure, the carbon absorber has been replaced. The carbon absorber has carbon held between two mesh screen sides. The side view of the parts may be more clearly seen.

Figure 5:
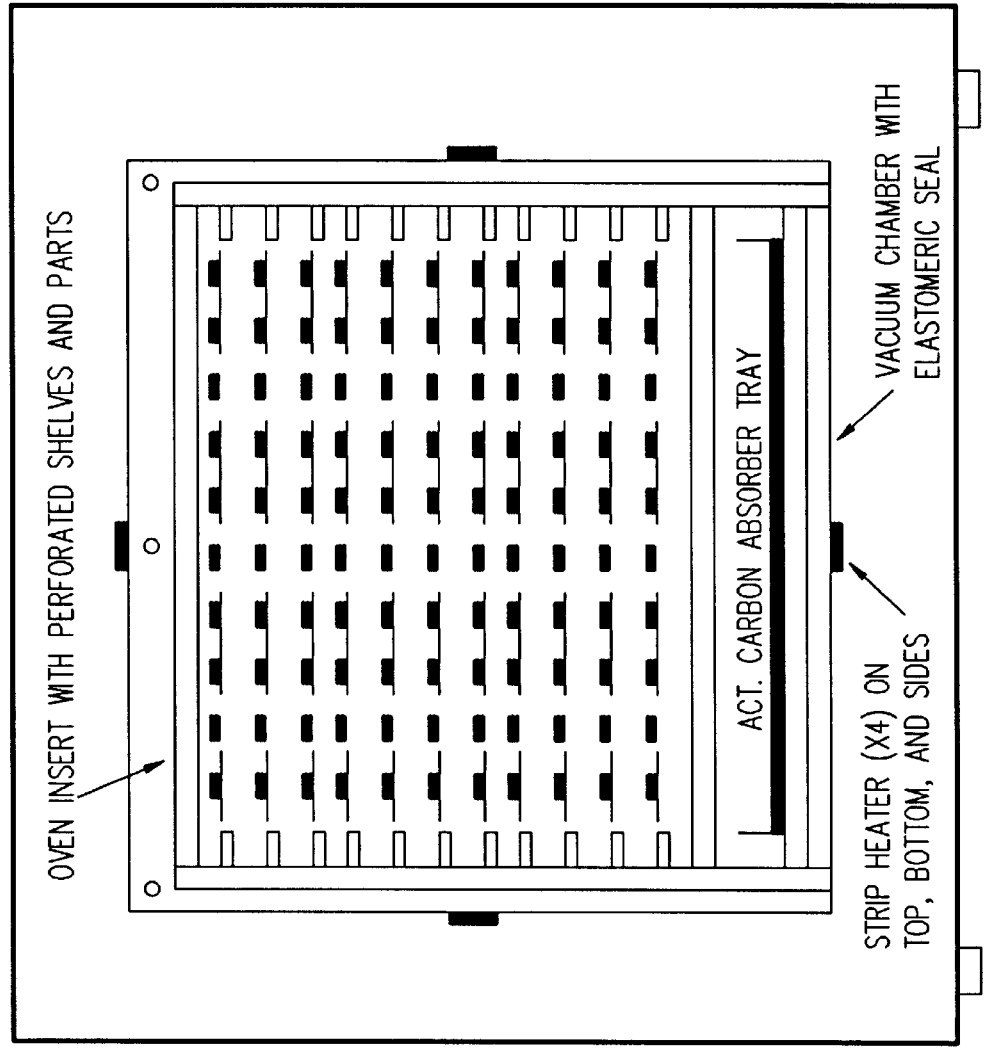
FIGS. 5 and 6 are respective front and side cutaway views depicting an alternative embodiment of the vacuum oven, fixture, and activated carbon absorber tray used in accordance with another aspect of the invention.

FIG. 5 is a front view of an oven chamber with an absorber tray comprising activated carbon also containing parts on perforated shelving.

Figure 6:
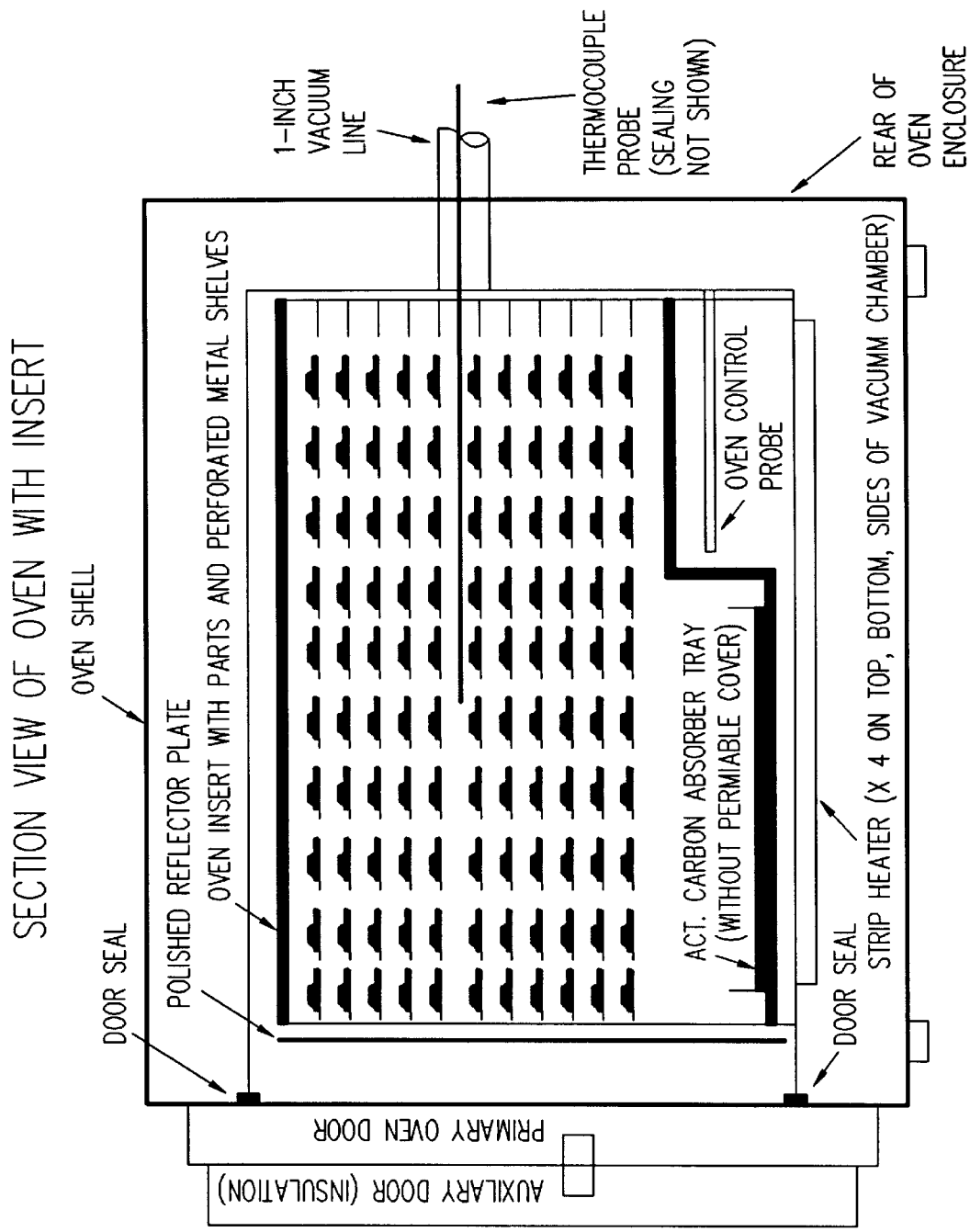

FIG. 6 is a side view of the oven depicted in FIG. 5. Hereagain, in this embodiment, a polished reflector plate is placed between the component and the auxiliary and primary doors.

Figure 7:
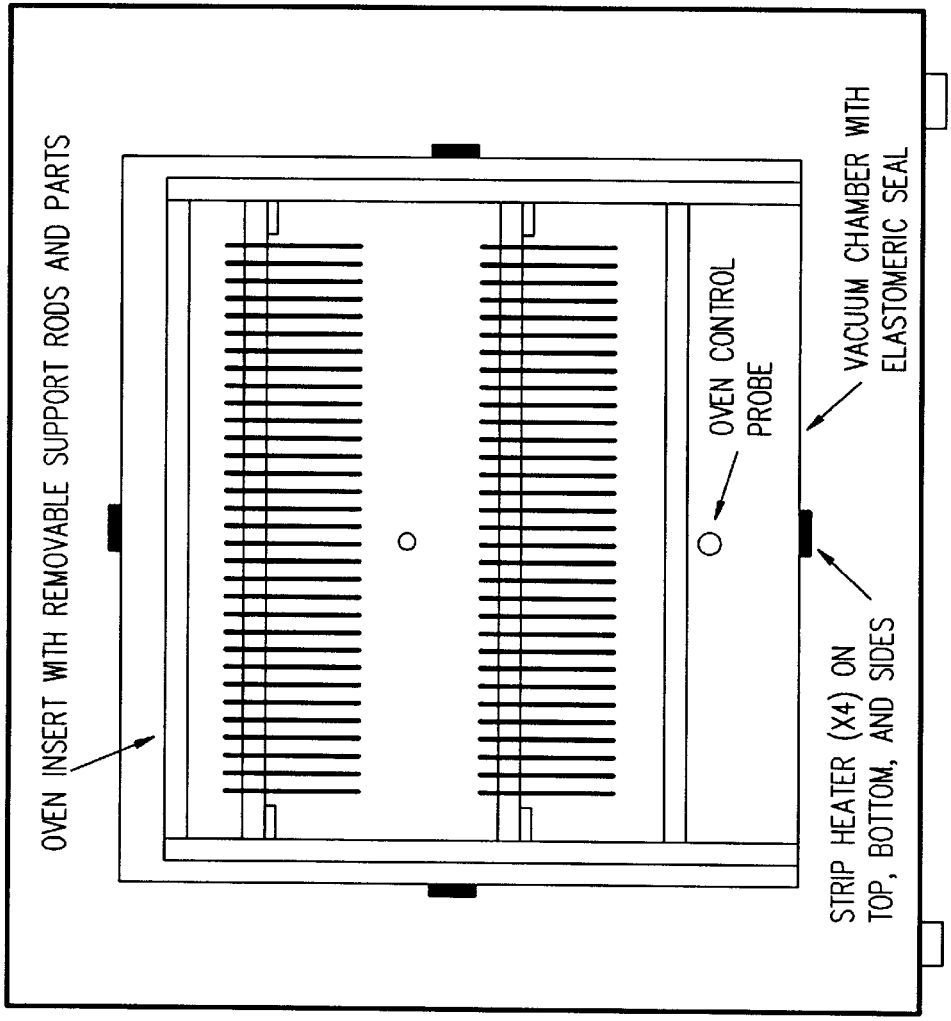
FIGS. 7 and 8 are respective front and side cutaway views depicting a further alternative embodiment of the vacuum oven, fixture and activated carbon absorber used in accordance with a further aspect of the invention.

FIG. 7 is a front view of an oven chamber also with the activated carbon absorber removed and in this instance the component parts are placed within the fixture on removable rods.

Figure 8:
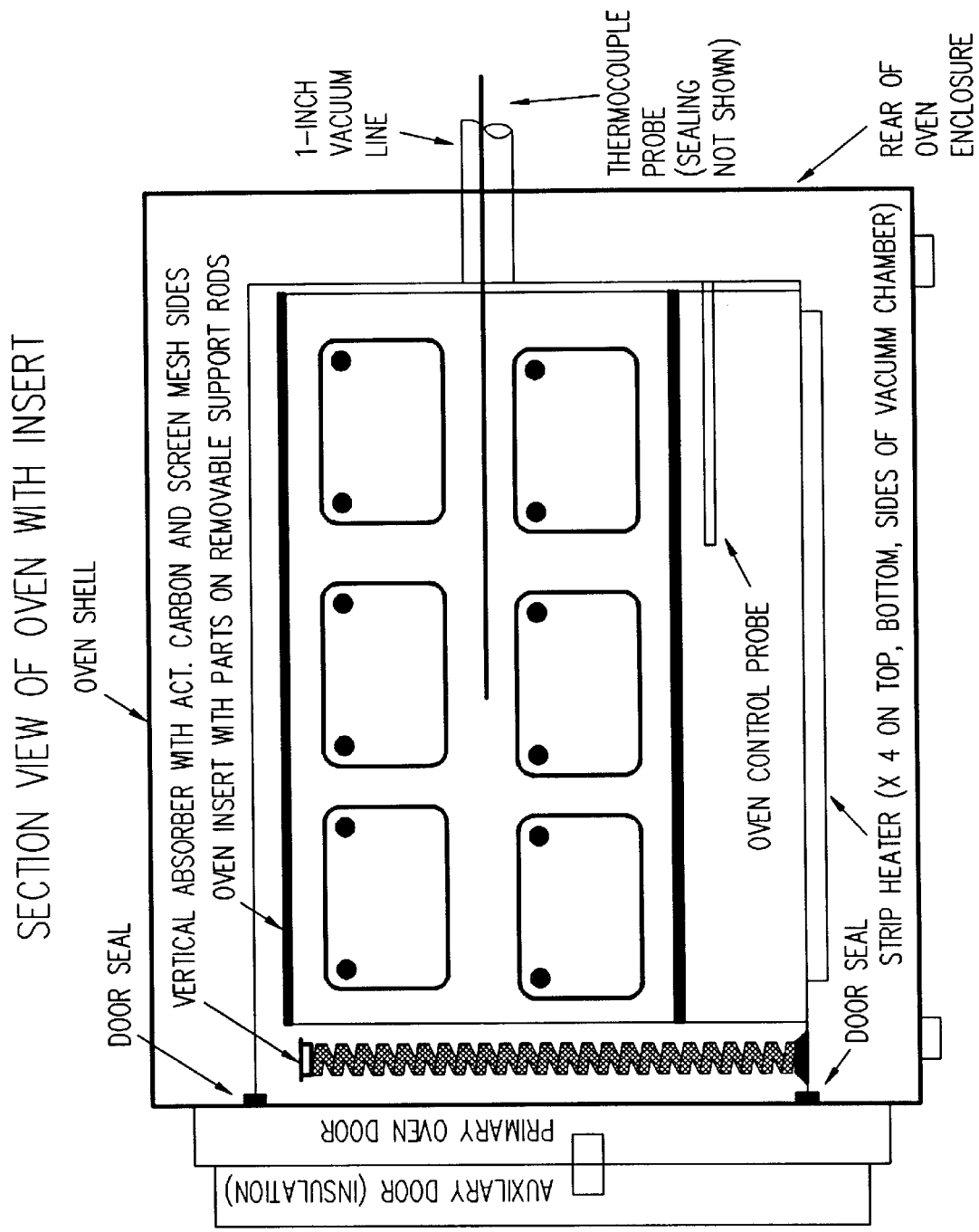

FIG. 8 is a cross sectional view of the oven system depicted in FIG. 7 showing the component parts placed upon removable rods. In this instance, the activated carbon absorber has been replaced.

A vacuum oven from Sheldon Model 1450D (Sheldon Mfg. Co., Cornelius Oreg.) having a 4.5 cubic foot capacity stainless steel vacuum chamber, electrical heaters on all four sides of the vacuum chamber, a PID (Proportioning, Integal, Derivative) temperature controller with digital readout using RTD (Resistance Temperature Detectors) as sensors, a metal framed glass door with a secondary door to provide protection and insulation for the glass, a 1 inch inner diameter stainless steel pipe projecting from the rear of the oven to provide connection for high pumping speed, tubulations (1 each ¼ inch OD and ⅜ inch OD both equipped with standard needle valves of corresponding size) attached to the vacuum chamber and to valves, and a one piece elastomeric vacuum seal which was mounted in a removable manner on the front lip of the vacuum chamber in a way to contact the door on closure was used for processing.

The door of the oven was closed by a positive cam draw latch to create a good mechanical contact prior to application of vacuum. As supplied, the stainless steel tube at the back of the vacuum chamber was threaded for 1 inch male NPT and sealed by means of a corresponding pipe cap using vacuum sealant or PTFE pipe tape.

An electrically driven Leybold D16B vacuum pump with a free air capacity of 13.4 cfm at 60 Hz line frequency and an ultimate vacuum of 0.1 millitorr (1E-4 Torr) was used. A foreline trap was used to prevent backstreaming of the oil from the pump which might contaminate the system. This trap was manufactured by Edwards for use with alumina beads. A standard high vacuum valve known as a 1 inch bellow sealed valve was employed to separate the vacuum pump from the vacuum chamber during venting. All components in the vacuum system were connected by means of NW25 KF type flanges, O-rings, and clamps, manufactured by Edwards, U.K.

NorCal Products (Yreka CA) supplied an adapter to connect 1 inch male NPT to NW25 KF flange, sections 18 inches long, of nominal 1 inch size metal bellows tubing with NW25 KF flanges, a NW25 KFT adapter, an adapter to connect an NW25 KF flange to a ⅛ inch inner diameter vacuum capable ferrule compression fitting; an adapter to connect an NW25 KF flange to a ⅜ inch id vacuum capable ferrule compression fitting. The KF-to-⅛ tube adapter must be bored through so that a ⅛ inch diameter tube can pass completely through the adapter.

For vacuum measurement, we used a Model 275 vacuum gauge controller and gauge tube both supplied by Granville-Phillips Co. The gauge tube was obtained with a welded NW25 KF flange for connection to a vacuum system.

A thermocouple probe with a closed stainless steel sheath of 24 inches length and ⅛ inch OD, and with a standard plug type thermocouple connector, was obtained from Omega Engineering. The stainless steel sheath was completely continuous along the entire length from the tip to the plug connector.

A digital temperature readout was also used which was compatible with the thermocouple plug and with a connecting cable to mate to the plug on the thermocouple. A replacement vacuum chamber seal for the oven made from fluroelastomer (Viton®) was also acquired.

We also used a device for measuring current such as a standard panel mount ammeter with a range suitable for the maximum current used by the oven heaters.

An oven insert or fixture was prepared with side and top and bottom of ½ inch thick aluminum. The insert did not exceed 16.5 inches in width nor a height of 16.5 inches or a depth of 20 inches. The insert was equipped to hold the parts with means of aluminum or stainless steel which may additionally be coated with a standard "non-stick" surface such as is common applied to cookware.

The exact configuration of the oven insert depended upon the parts to be baked and the required oven loading for each operation. In design of the insert one must consider the space required for transport of the outgas vapors to a trap. A common support means was a shelf made of perforated or expanded metal with at least 50 percent open area. Spacing of the shelves was set to allow adequate clearance between parts and adjacent shelves for ease of removal and replacement of the shelves.

A thermal reflector was prepared by polishing a thin sheet of stainless steel (0.02–0.04 inches) and providing means for it to be attached to the front of the oven insert in a manner which provide a gap of ¼ to ¾ inch between the reflector and the oven insert to allow for vapor diffusion. This reflector was used if the vapor trap to be used is either a cooled oven door or a bottom mounted carbon tray.

A horizontal carbon absorber was constructed from a tray with an optional vapor permeable filter cover to control particulate emissions. Aluminum or stainless steel are examples of suitable materials of construction. The tray was placed on or just above the bottom of the oven insert. This tray resembled a simple cake baking tray and typically is of dimension 11 inches by 14 inches by 2 inches deep and was filled with carbon to a depth of approximately 1 inch with a high grade coconut shell base carbon such as 207C (Barnaby Sutcliffe, Columbus, Ohio) or PCB (Calgon Carbon, Pittsburgh, Pa.) with a standard mesh range of 4–8 although the exact mesh range was not critical. This provides a carbon fill of approximately 2 pounds. With this installation the internal heat reflector was needed.

A vertical carbon absorber was constructed in much the same manner as standard carbon air filters, i.e. a flat box with one or both of the two opposite large sides made from a permeable material such as wire mesh screen, three solid sides connected rigidly to each other and to the permeable material, and one side which is removable to allow filling and emptying of the carbon. The vertical carbon absorber (sometimes referred to as a carbon absorber wall) was 16–17 inches in height and width and ¾ to 1¼ inch in thickness and usually provided with feet to provide greater stability. The removable side was the top. Such an absorber provided for a carbon fill of between 1.5 and 3 pounds depending on exact dimension. A screening material was used for the permeable sides having a standard mesh number which contained the carbon, e.g. for a carbon fill of 4×8 mesh the screen opening was no more than half the size particle size listed for 8 mesh in standard tables, and preferably smaller.

After filling with carbon, the unit was closed and then vacuumed. If this was not done dust may be shed into the vacuum chamber during use of the absorber.

For an oven door to be used as a cool trap the secondary insulating door is removed from the main oven door and a metal sheet bearing a source of air such as a fan is mounted in place of the secondary door. The metal steel serves to hold the air source while providing a shield for the glass in the main oven door. The installation should have a gap of at least ½ inch between the metal sheet and the main door to allow for exit of the air after cooling of the window. With this installation the internal heat reflector is needed.

The system was assembled by removing the cap on the 1 inch vacuum port. In place, the adapter converting 1 inch male NPT to NW25 KF flange was attached. The threads were sealed with PTFE tape or preferably with an anaerobic cured vacuum thread sealant such as available from Loctite Corp.

Using appropriate o-ring and clamp, the NW25 KF T adapter were attached to the corresponding fitting just installed by means of the adapter. The T adapter was oriented so that crossbar of the T was horizontal and the leg of the T is downward.

The vacuum pump was filled with oil and installed, wired and exhaust vented according to manufacturers instructions and local codes. the foreline trap was filled with supplied alumina absorbent beads according to the manufacturers instructions. Attach to trap by means of the NW25 KF flanges, o-ring, and clamp to the inlet port of the vacuum pump. The bellow sealed 1 inch vacuum valve was attached to the other port of the foreline trap by means of the NW25 KF flanges, o-ring, and clamp. The valve was oriented to allow convenient access to the handle to allow opening and closing.

The leg of the NW25 KF T was connected to the vacuum valve by means of NW25 flanges, o-rings, and clamps using the 1 inch nominal stainless steel bellow tubing. The typical installation required two standard 18 inch lengths. At least one length of bellow tubing must be used regardless of installation to reduce transmission of vibration from the pump to the vacuum chamber.

The KF-to-⅛ inch compression adapter was attached to the free end of the T adapter crossbar by means of NW25 flanges, o-ring and clamp. The thermocouple probe was inserted through the ⅛ inch compression fitting so that the end of the probe passes though the T adapter and the 1 inch tube at the rear of the vacuum chamber. The probe was inserted sufficiently that the closed end lies within, and between 9 and 12 inches from the rear of, the vacuum chamber. The compression fitting was tightened to lock the probe in place and to allow the fitting to be vacuum tight. Connect the plug on the thermocouple to the temperature readout by means of a thermocouple extension wire in accordance with the thermocouple and readout manufactures instructions.

The valve was removed from the ⅜ inch oven tubulation and replaced by the adapter for ⅜ inch tubing to NW25 KF flange. The vacuum gauge tube was attached to the ⅜ inch tubing by means of the NW25 KF flanges, o-ring and clamp. Assembly of the vacuum gauge and readout was completed according to the manufacturer instructions.

The ¼ inch tubulation may be attached to a source of clean gas to vent the oven to atmospheric pressure at the end of the operation. Commonly a small air line filter with particulate filtering and chemical absorption capability was used, such as Koby Inc. (Marlboro MA) type 125-SS.

The oven was typically supplied with a silicone seal for the vacuum chamber. This silicone seal was removed and the metal frame upon which the seal had been mounted was cleaned with an appropriate solvent such as hexane or methylene chloride. The metal frame was dried of solvent and the fluoroelastomer seal was mounted in place.

The supplied shelves and shelf supports were removed from the interior of the vacuum chamber as these block installation of the insert. Place the insert within the oven centered right to left and as far back as possible.

The oven was wiped down with solvent such as methylene chloride or methylthyl ketone, was dried of solvent, and then baked out at a temperature of at least 225 degrees Celsius under vacuum for 24 hours prior to first use as a precaution against manufacturing contamination. The absorber was baked out at a temperature at least 25 degrees Celsius above the temperature at which the parts are to be baked.

To operate the apparatus, the following process was generally followed:

1: Close vacuum valve.
2: Vent vacuum oven to atmospheric pressure with filtered clean air or dry nitrogen.
3: Open door and remove shield and or carbon absorber if present.
4: Remove parts or part support trays.
5: Reinstall shield or carbon absorber and close door. (To retain heat)

6: Allow parts to cool to room temperature.

7: Repackage parts as required.

8: Load new parts on trays or supports.

9: Open door, remove shield and or carbon absorber.

10: Introduce parts supports and parts into oven.

11: Replace shield and or carbon absorber.

12: Check door gasket sealing surface, and clean if necessary.

13: Close door and vent valve.

14: Open vacuum valve partially, allowing the pressure in the oven to fall to below 500 Torr, then open the valve fully.

15: After 1 hour, the pressure should be below 1 Torr. If the pressure is not below 1 Torr, close the vacuum valve and call key operator.

Alternative process steps

If a double set of parts supports exist, then steps 5 through 15 are replaced by the following.

5: Introduce parts supports and parts into oven.

6: Replace shield and or carbon absorber.

7: Check door gasket sealing surface, and clean if necessary.

8: Close door and vent valve.

9: Open vacuum valve partially, allowing the pressure in the oven to fall to below 500 Torr, then open the valve fully.

10: After 1 hour, the pressure should be below 1 Torr. If the pressure is not below 1 Torr, close the vacuum valve and call key operator.

11: Parts removed in step 4 should be repackaged when cool.

WORKING EXAMPLE 1

Using the process and apparatus detail above, elastomeric motor bearing shields containing acrylonitrile/butadiene copolymer on low-carbon steel backing were processed according to the invention at 130° C. for 24 hours. The final pressure achieved during the vacuum processing was less than 20 millitorr. The degassed contaminants included of dibutyl phthalate, dioctylphthalate, dioctyl diphenyl amine, fatty acids, methylsiloxane and mixtures of various saturated, nonfunctionalized hydrocarbons having a molecular weight average of between 300 and 400 see the Table, below.

The total amount of degassed materials was between 95 and 100% of the contaminants initially being 5 wt % of the materials weight removed from the motor bearing shields. The amount and identity of the volatile organics was characterized and determined by a combination of trapping volatiles on the absorptive carbon filter followed by isolation using a soxhlet extraction. The extract was than concentrated and analyzed in $CDCE_3$ solvent. Isothermal thermogravimetric analysis was undertaken at 75 to 100° C. for 24 hours

TABLE

| Shield Type Baking State | Dioctyl phthalate µg/shield | Dibutyl phthalate µg/shield | Aliphatic hydrocarbons µg/shield | Methyl Silicones µg/shield | AMINES µg/shield |
|---|---|---|---|---|---|
| F-Seal | | | | | |
| Before | 0 | 0 | 240 | 0 | 80 |
| After | 0 | 0 | 60 | 0 | 0 |
| 696V | | | | | |
| Before | 90 | 390 | 500 | 70 | 130 |
| After | 0 | 0 | 90 | 45 | 0 |

WORKING EXAMPLE 2

An electrostatic media made of fibers including thermoplastic polypropylene was processed according to the invention at temperatures ranging from 75° C. to 95° C. for 24 hours. The degassed material included C10-C18 fatty acids and polypropylene oligomers having a molecular weight of between 250 and 300 as determined by NMR, gas chromatography, mass spectroscopy, and thermogravimetric analysis. The resulting degassed constituents comprised 100 to 200 micrograms volatiles per mg of polymer determined using the methods of Example 1. Greater than 95% of the volatiles were removed totaling 0.4 wt % of the total weight of the bulk material. The vacuum procedure included the use of an absorptive carbon filter. The final pressure achieved during the vacuum processing was less than about 20 millitorrs.

WORKING EXAMPLE 3

The elastomeric gasket covers comprised in part of EPDM rubber were than processed according to the invention at 135° C. for 24 hours. The degassed materials included 400 to 500 micrograms per part of various saturated nonfunctionalized hydrocarbons having a molecular weight of 300 to 400. The total amount of contaminants removed was greater than 99% with the initial concentration of degassed materials removed equaling 0.1 wt % of the total article weight. Determination of the nature and character of the degassed materials was done in the same manner as with Example 1. The final pressure achieved during the vacuum bake process was less than 20 millitorr.

WORKING EXAMPLE 4

A crash stop was then processed according to the invention containing thermoplastic elastomers based on polyurethanes. This article was processed at 140° C. to 150° C. for 24 hours resulting in 200 micrograms of degassed materials which were characterized as cyclic dimers of caprolactone using the same processes as in Example 1. As with Examples 4–6, the final pressure achieved during the vacuum processing was less than 20 millitorr. The total amount of contaminants removed was greater than 99% of the contaminants in the article with the total weight of the contaminants initially being 0.1 wt % of the total article weight.

WORKING EXAMPLE 5

A voice coil magnet damper containing elastomers of polyacrylate was than processed according to the invention at 80° C. for 24 hours. The final pressure achieved during the vacuum baking process was less than 20 millitorrs. During the processing, the degassed materials included 300 to 600 micrograms of acrylate monomers, benzoyl peroxide, butyl acrylates, and acrylic acids having a molecular weight of about 150 to 200 determined in the same manner as in Example 1. The total amount of volatile contaminants removed was greater than 90% with the initial concentration of contaminants being 1 to 2 wt % of the total bulk weight of the damper.

The above specification, examples, and data provide a complete description of the claimed invention. Since many embodiments of the invention can be made without departing from the spirit and scope of the invention, the invention resides on the claims hereinafter appended.

The claimed invention is:

1. A method of degassing a disk drive component, said method comprising the steps of:
   a) heating the drive component to the service temperature of the component, said temperature ranging from about 30° C. to 250° C.;
   b) subjecting the drive component to vacuum pressure during said heating, wherein said vacuum pressure comprises a first pressure and a second pressure; and
   c) monitoring said vacuum pressure to determine the level of degassing of the disk drive component.

2. The method of claim 1, wherein said disk drive component comprises filter media which are heated at a temperature ranging from about 75° C. to 95° C.

3. The method of claim 1, wherein said disk drive component comprises a motor bearing shield including an elastomer which is heated at a temperature ranging from about 120° C. to 1350° C.

4. The method of claim 1, wherein said disk drive component comprises a cover gasket which is heated at a temperature ranging from about 120° C. to 150° C.

5. The method of claim 1, wherein said disk drive component comprises a crash stop which is heated at a temperature ranging from about 140° C. to 150° C.

6. The method of claim 1, wherein said disk drive component comprises a voice coil magnet damper which is heated at a temperature ranging from about 70° C. to 90° C.

7. The method of claim 1, wherein said disk drive component comprises a resin selected from the group consisting of a thermoset resin, a thermoplastic resin, and mixtures thereof.

8. The method of claim 7, wherein said thermoset resin is selected from the group consisting of an epoxy, a curable acrylate, a polyimide, and mixtures thereof.

9. The method of claim 7, wherein said thermoplastic resin is selected from the group consisting of a polyetherimid, a polyolefin, a polyamide, polyacetal, a polyurethane, a polyester, a urethane, and mixtures thereof.

10. The method of claim 1, wherein heating is undertaken for about 10 to 12 hours at a temperature ranging from about 80° C. to 150° C.

11. The method of claims 1 or 10, wherein said first pressure is greater than about 1000 millitorr and said second pressure is less than about 50 millitorr.

12. The method of claim 11, wherein said second pressure ranges from about 20 millitorr to less than about 10 millitorr.

13. The method of claim 12, wherein said second pressure ranges from about 10 millitorr to 20 millitorr and said component is at least about 90% degassed.

14. The method of claim 13, wherein said component is at least about 95% degassed.

15. A method of degassing a disk drive component, said method comprising the steps of:
   a) heating the drive component to the service temperature of the component, said temperature ranging from about 30° C. to 250° C.;
   b) subjecting the drive component to a first vacuum pressure during said heating, and
   c) monitoring said vacuum pressure to determine the level of degassing of the disk drive component.

16. The method of claim 15, wherein said disk drive component comprises filter media which are heated at a temperature ranging from about 75° C. to 95° C.

17. The method of claim 15, wherein said disk drive component comprises a motor bearing shield including an elastomer which is heated at a temperature ranging from about 120° C. to 135° C.

18. The method of claim 15, wherein said disk drive component comprises a cover gasket which is heated at a temperature ranging from about 120° C. to 150° C.

19. The method of claim 15, wherein said disk drive component comprises a crash stop which is heated at a temperature ranging from about 140° C. to 150° C.

20. The method of claim 15, wherein said disk drive component comprises a voice coil magnet damper which is heated at a temperature ranging from about 70° C. to 90° C.

21. The method of claim 15, wherein said disk drive component comprises a resin selected from the group consisting of a thermoset resin, a thermoplastic resin, and mixtures thereof.

22. The method of claim 21, wherein said thermoset resin is selected from the group consisting of epoxies, curable acrylates, polyimides, and mixtures thereof.

23. The method of claim 21, wherein said thermoplastic resin is selected from the group consisting of a polyetherimid, a polyolefin, a polyamide, polyacetal, a polyurethane, a polyester, a urethane, and mixtures thereof.

24. The method of claim 15, wherein heating is undertaken for about 10 to 12 hours at a temperature ranging from about 80° C. to 150° C.

* * * * *